May 23, 1961   J. BOEKE   2,985,007
CHROMATOGRAPHY METHOD
Filed June 19, 1958
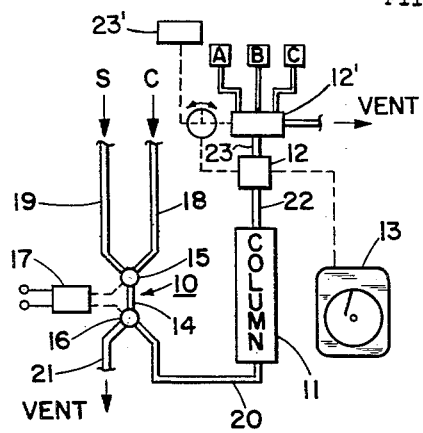
FIG. I
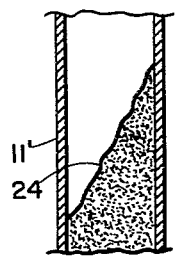
FIG. II
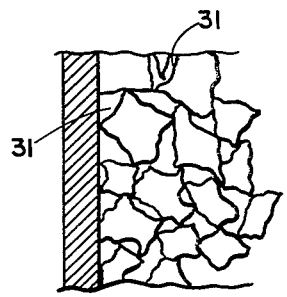
FIG. III
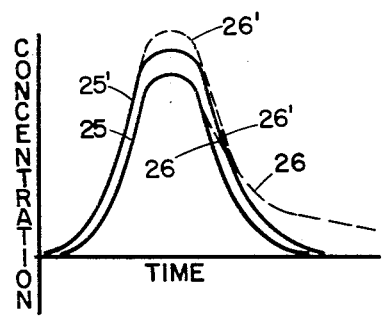
FIG. IV
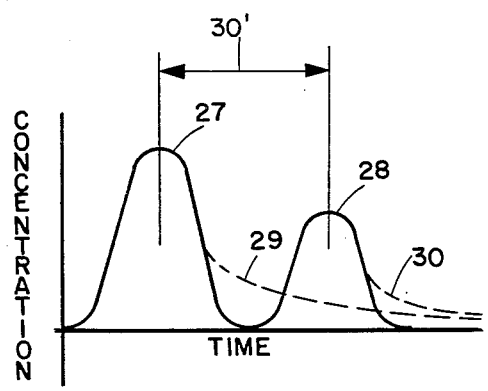
FIG. V
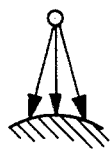
FIG. VI
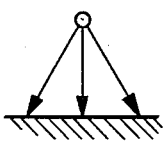
FIG. VII
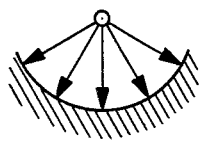
FIG. VIII
INVENTOR.
JAN BOEKE
BY
Lawrence H. Patton
AGENT United States Patent Office 2,985,007
Patented May 23, 1961

2,985,007

CHROMATOGRAPHY METHOD

Jan Boeke, Concord, Mass., assignor to The Foxboro Company, Foxboro, Mass., a corporation of Massachusetts Filed June 19, 1958, Ser. No. 743,064

6 Claims. (Cl. 73—23)

This invention relates to processing of gas mixtures and to means for separating out components of such mixtures in the course of such processing.

This invention particularly relates to gas mixture component separation by a new and improved method involving special treatment of separation media as accomplished through special relationships between various factors involved in such separation.

Conventional gas mixture component separation may be accomplished by passing a measured slug of sample-gas mixture through a body of sorptive granular particles. Such a body is commonly called a column. The sample-gas mixture is travelled through the column by means of a stream of carrier gas. The carrier gas may essentially push the sample through the column as in "displacement" or the carrier gas may essentially pull the sample through the column as in "elution." This invention is concerned with elution.

Such activity is called chromatography. The word chromatography comes from early experiments using the principles of sorption to separate coloring matter from leaves. Through various intermediate steps the word chromatography is now applied, as in this invention, to gas mixture component separation techniques.

Each component in a gas mixture has its own "affinity," i.e., such as its sorptive relation, with respect to a given column material. Therefore, each such component will cling to that material for a time which is characteristic to it alone and to no other of the components. The time during which each component clings to the column material is called its retention time.

In a particular situation, such as at given temperature, flow rate, and pressure, and with the same carrier gas, column, column condition and the like, a component will have repeatability with respect to its retention time. Since each sample component has this unique "clingability" or retention coefficient, it will stay a longer or shorter time in the column than the other components in the gas mixture. Eventually all components in the mixture will be moved out of the column by the carrier gas. As each component emerges from the column, a detector device such as an electrical bridge type of dual thermal conductivity cell may be used to measure its magnitude as against a reference condition in the conductivity cell. The output of the detector is in peaked curve form, wherein each peak may represent one component, and the quantity of each of the components is taken to be represented by the area under its respective curve. Curve measurement may be made by integration or in some cases by computation on the basis of peak height.

The identity of each sample component is known by predetermination, so the location of its peak along a separation time axis is also known. Thus the initial and final arrival times of the component curve at the detector, as well as the peak apex time, are known and used in programming a chromatographic system. Accordingly the measurement accomplished by this system is one of relative quantity only, a percentage composition measurement representing the concentration of a component in a sample-gas mixture.

There are two general forms of chromatographic analysis, i.e., gas-solid, and gas-liquid. The gas-liquid form may be represented by "partition" chromatography, which involves the use of a granular separation column wherein the granules are covered with a liquid film. The carrier and sample gases are passed through the column with the sample gas components interacting with respect to the liquid film.

Partition chromatography is useful in many instances, but gas-solid columns can provide the same retention power in less column length.

Accordingly, as in this invention, it is often desirable to use gas-solid chromatography, i.e., the use of sample and carrier gases on a given column of sorptive material such as porous granules. However, a prior art difficulty has been found in that undesirable "tailing" often occurs.

Tailing, in this connotation, refers to the prior art problem of nonsymmetrical peaks in curves representing chromatographically separated sample-gas mixture components. For example, a lagging tail appears as an extended, i.e., more gradual, slope on the trailing edge of a peak, and is an indication of a delay in departure, i.e., desorption, of the last portion of a sample-gas mixture component from the separation column. Such tailing often results in poor separation due to overlapping between adjacent component curves so that individual curve measurement is not fully representative of the related component concentration. Bodily tipping curve formations are not a concern of this invention when such formations, although not symmetrical, do not change in form with component concentration change. This invention is concerned with "pernicious" tailing, wherein the curve form changes with changes in the relative quantity value of the related component concentration changes.

This invention, therefore, relates to sample-gas mixture component separation by gas-solid elution chromatography, and has particular reference to the phenomenon known as "tailing."

In the areas of prior art tailing with which this invention is concerned, tailing curves cannot be properly measured by integration when there is more than an allowable minimum of tailing overlapping of adjacent curves. Also, curves cannot be properly measured by peak height methods when there is tailing overlapping including a point directly beneath a peak apex or when, as in tailing curves, component concentration changes result in curve form changes beyond an allowable minimum.

Thus the purpose of the method of this invention is to achieve separation in a particular column length, through column material loading, by reducing tailing on a predetermined basis to a particular point for a particular separation operation, either separation for analysis or separation for production. This particular point to which tailing is reduced according to this invention is the point of suitable isolation for a particular separation operation. If measurement by integration or separation for production is suitable or desirable, the tailing is cut to the point of no effective overlap with the next following curve so that the maximum of the component may be produced, or all of the effective area under the curve may be reached by integration. Or, if measurement by peak height is suitable or desirable, the tailing is cut to the point at which component concentration changes do not result in material changes in curve form, and at which tailing overlap does not include a material area directly beneath a peak apex.

The locations of such minimum effective tailing points are, in each case, determined by experiment and/or reference to prior experiments or analyses, based on sample-carrier sorptiveness with respect to particular sorptive materials.

The tailing reduction must leave a sufficient condition of column sorptiveness to provide effective component peak apex to peak apex separation. Consideration is given to the probable condition that such separation may or may not be different after loading of the column material. Column length is also a factor of such separation. Tail cutting of this invention provides a separation gain which may be distinct from this peak apex to peak apex separation.

This invention is a method of controlling such tailing on a predetermined basis wherein sorption column material is loaded by deposition from a gaseous body, for example by passing the gaseous body through the column material prior to the application of the sample gas thereto. Deposition is accomplished, for example, by impact from natural molecular movement, or by flow impact. In furtherance of this method, a deposit from such a gaseous body is related by predetermination to a sample-gas mixture component of interest in terms of sorptiveness, i.e., the retentive strength of each on a competitive basis with respect to selected column material. Such predetermination may be facilitated at least in many cases by reference to the temperature ranges between the boiling and critical temperature points of the sample gas and of the loading gas, in relation to the operating temperature of the column, as discussed hereinafter.

Symmetrical peaks are theoretically obtainable on a large flat surface. This may be considered as a linear adsorption isotherm column wherein there is a linear relation between the amount of adsorbed sample component and the concentration of the sample component in the sample-gas mixture. Practically, it is necessary to provide relatively short columns to get readable peaks in reasonable time periods. This is accomplished by using short columns of material such as granular particles which provide very large sorption surface areas in small volumes.

Prior art separations with such columns, especially in the oil industry and with respect to sample-gas mixtures containing hydrocarbons in the $C_2$-$C_5$ range as components of interest, result in undesirable tailing with consequent poor separation of sample-gas mixture component curves.

Consideration of the "flat surface" theoretically perfectly symmetrical curve, i.e., as from a linear adsorption isotherm column, and the granular particle column non-symmetrical or "tailing" curve, in the light of the known varied surface and porous character of the usual granular sorption material, leads to the conclusion that "tailing," i.e., retention strength variation within a single sample-gas component, is caused by variation of sorptiveness within the sorption material. Such sorptiveness variation is believed to exist in and/or on each sorption particle, and probably between abutments of particles.

In this invention, a granular particle column can act largely as if it were a "flat area" column, in terms of curve symmetry. Thus this invention proves a method wherein a sorption particle column is substantially modified, to a predetermined condition, in the direction of achieving a linear adsorption isotherm column, in terms of curve symmetry. One way of expressing this invention is that the sorptivenesses of different portions of a sorptive material body can be modified substantially toward equalization with respect to any one component of a sample-gas mixture. Thus tailing can be materially reduced, and on a predetermined basis, as will be seen hereinafter.

This invention lends itself to a continuing process of gas-solid chromatography, for example, as a part of an industrial plant stream operation.

This invention, further, obviates the prior art disadvantages by providing sample-gas mixture component separation based on a predetermined reduction of tailing.

It is therefore an object of this invention to provide a new and improved method of gas-solid chromatography.

Another object of this invention is to adapt a body of sorptive material to predetermined gas-solid elution chromatography separation needs of a sample-gas mixture.

Another object of this invention is to modify a sorption particle column in the direction of achieving, on a predetermined basis, the character of a linear adsorption isotherm column, in terms of curve symmetry.

Another object of this invention is to provide improved gas-solid chromatography by relating a loading gas to a sample-gas mixture in terms of the sorptiveness of each with respect to a particular body of such sorptive material.

Another object of this invention is to provide a gas-solid elution chromatography method wherein a column loading gaseous body is selected as being related to a sample gas in terms of their respective sorptiveness with respect to a particular separation column, such selection, for example, being made on the basis of boiling point-critical temperature range with respect to the operating temperature of the column.

Another object of this invention is to provide, in gas-solid elution chromatography, the method of controlling tailing on a predetermined basis, comprising loading sorption material by deposition thereon from a gaseous body.

It is another object of this invention to provide, as representative examples, the methods of using as chromatographic combinations (1) dichlorodifluoromethane ($CCl_2F_2$) carrier gas, with silica gel adsorbent and a $C_4$ hydrocarbon containing sample; (2) a combination of nitrogen and water vapor as a carrier, with alumina adsorbent and an L.P.G. (liquid petroleum gas) as a sample; and (3) steam as a carrier, with an activated charcoal adsorbent and an aromatic gas as a sample.

Another object of this invention is to provide a new and improved method of production line separation of sample-gas mixtures.

Another object of this invention is to provide a new and improved method of analysis separation of sample-gas mixtures.

Another object of this invention is to control chromatographic tailing to produce sample-gas mixture component curves which are measurable on a practical basis by one of the means in the group comprising integration and peak height measurement.

Other objects and advantages of this invention will be in part apparent and in part pointed out hereinafter.

In the drawing:

Figure I is a schematic illustration of a chromatographic gas-solid separation system according to this invention;

Figure II is a partial showing of the column of Figure I in vertical central section, with a fragmentary showing of a body of sorptive particles therein;

Figure III is a greatly enlarged fanciful illustration of the outline assembly of a body of sorptive particles in a separation column such as that of Figures I and II;

Figure IV is an illustration of chromatographic sample gas sorption retention curve variations, with and without tailing, and illustrating the effects of component concentration changes;

Figure V is an illustration of curve separation and of tailing interference between adjacent curves;

Figure VI is a schematic illustration of the forces of sorption on a gas molecule with respect to a convex surface;

Figure VII is a schematic illustration of the forces of sorption on a gas molecule with respect to a flat surface; and Figure VIII is a view illustrating the greater sorption forces on a gas molecule with respect to a concave surface.

Figure I is a schematic illustration of a chromatographic gas analysis system according to this invention. It comprises a gas sampling switch unit 10, a separation column 11, a detector unit 12, and a recorder instrument 13. The sampling switch unit 10 consists of a fixed volume gas sample pipe 14 with inlet and outlet valves 15 and 16 and a solenoid unit 17 arranged to operate the valves 15 and 16 in sequence suitable to repeatedly isolate bodies of sample gas in the fixed volume pipe 14 and to transport these bodies of sample gas individually to the column 11 by means of carrier gas. Leading to the input valve 15 is a carrier gas supply pipe 18 and a sample-gas supply pipe 19. Leading from the output valve 16 is a connection pipe 20, to the column 11, and a vent pipe 21.

The output of the column 11 is through a pipe 22 to the detector 12, with an outlet as at 23. A common form of detector unit for use as indicated here is a thermal conductivity comparator. A sample-gas mixture component of interest arrives at the detector 12 in a binary mixture of this component and the carrier gas. By means of a Wheatstone bridge electrical arrangement (not shown), with a reference gas about one leg of the bridge and the sample component flowing about another leg of the bridge as a variable, thermal conductivity difference between a sample component and the carrier results in upsetting the bridge and provides an electrical output representable as a peaked curve, the measurement of which provides a representation, as in the recorder 13, of the sample component concentration in the carrier gas. Other detection methods may be used depending on available factors of difference between the carrier and the sample components, such as their separability in some fashion.

The method of this invention may be in the form of a sample-gas mixture analysis separation of components or in the form of a sample-gas mixture production separation of components.

In Figure I, the outlet 23 of the detector 12 is applied to a multiple valve unit 12′ which may be operated by a timer 23′ or directly from the detector as indicated by dotted lines therebetween through a rotary selector unit. Such operation may be accomplished through suitable conventional devices (not shown). The multiple valve unit 12′ has separately connectable outlet trap units A, B, and C, and an outlet vent. When the system is used for analysis separation, the vent only is connected. When the system is used for production separation, one or more of the trap units A, B, C, are connected, individually, to receive separate components of the sample-gas mixture. In this case the vent may be used to vent the carrier gas between components or to vent undesired components. A final binary separation is accomplished by suitable conventional means (not shown) to separate the component in A, B, or C, from that portion of the carrier which also reached that particular trap. This may be done, for example, on a temperature basis, i.e., by heating or cooling. The result is sample-gas mixture individual component collection on a production basis, in a high degree of purity.

The immediate concern of this invention is chromatographic separation means, for example, the column 11, and the method of sample-gas mixture separation therein. The remaining figures of the drawing, i.e., Figures II–VIII, inclusive, all relate to the separation column, the sorptive particles therein, and the action of gases in the column.

Figure II illustrates a fragment of a body of sorptive particles 24 in a chromatographic column 11′. Various materials are usable as sorptive particles in gas-solid chromatographic columns. Suitable for use in columns of interest in this invention, for example, are activated alumina, silica gel, and activated charcoal. The sorption particles are made to the size order of small grains of sand with each particle porous.

Gas sample separation by sorption may be accomplished on flat surface areas, but good separation is difficult and requires an impractical number or size of such areas. Sorption columns may be provided in practical sizes only by providing great areas of sorptive surface in small volume. This is accomplished by the use of porous bodies such as particles as described above.

In a body of such particles, each component of a sample-gas mixture is retained to a different degree, so that such components are separated in the column and emerge individually therefrom. Such separation may be enhanced by suitable selection of sorption material and column length. This invention is concerned with the substantial improvement of any one such situation. Under given sets of prior art conditions wherein sample-gas mixture components exhibit undesirable tailing, the application of this invention will materially improve the situation and effectively eliminate such tailing.

The tailing with which this invention is concerned is illustrated in Figures IV and V. In Figure IV, the solid black line essentially symmetrical curve 25 represents a sample-gas mixture component concentration, wherein the area under the curve represents the total concentration. Such a curve 25 may be measured on the simple basis of peak height. A curve which starts like the curve 25 and ends in a tail, as indicated by dotted line 26, is measurable by integration but is not suitably measurable by peak height methods because of curve form changes which occur with component concentration changes. The solid line curve 25′ is like curve 25 but represents a different component concentration. Also the dotted line curve 26′ represents a component concentration change with respect to the curve of which the dotted line 26 is a part.

Thus, even if fully separated from adjacent curves, this latter curve form (26) must be integrated to suitably measure the total area under the curve. Tailing is troublesome in varying degree, and tailing reduction according to this invention is substantial and sufficient to make peak height measurement acceptable in representation of component concentration or to make full integration possible.

In Figure V, two curves each like curve 25 of Figure IV are shown as representing adjacent components as separated from a sample-gas mixture. The solid line curves 27, 28 are representations of component concentrations without tailing, and the dotted line extensions 29, 30 represent tailings of the curves 27, 28. It should be noted that the tailing of curve 27 passes into the area under curve 28. Thus, a measurement of either curve cannot be entirely accurate since, over a substantial area, one curve is super-imposed on the other. Note that the tail 29 covers an area under the apex of curve 28, so that curve 28 is not properly measurable by peak height methods. The arrow 30′ represents the curve separation distance which is changeable by changing column length and which may or may not change as the column is loaded. The separation of this invention is on the basis of tail cutting, i.e., reducing a tail such as 29.

It is believed that tailing of a sample-gas component occurs because the sorptive deposit from the gas such as its condensate, pseudo-condensate, the gas itself, or other deposit, gets trapped in the body of sorption particles, either in between particles as indicated in Figure III at 31, for example, or in the individual particles, in the various openings therein such as capillary openings (not shown) as provided by the porous structure of the particles.

Such trapping areas as well as plane and lesser curved surfaces may be called "active sites" and they hold gas molecules, or associated matter, in varying degree of retention strength, depending on the mutual sorptiveness of the gas deposit and the particles, and the size, shape, and location of the site.

It seems evident that openings and capillaries in each particle have stronger sorptive powers than plane or convex surfaces. This is illustrated in Figures VI–VIII as representations of sorption forces on a gas molecule with respect to a convex surface (Figure VI), a plane surface (Figure VII), and a concave surface (Figure VIII). The closer association of molecule and surface as shown in Figure VIII indicates that a molecule, in gas, pseudo-liquid, or liquid form, may be held more strongly on a concave surface than on either a plane or a convex surface.

It is believed that the sorptive forces of attraction between a sample-gas component and sorption particles, including the capillary forces in particle openings, have in the past caused sample gases to be trapped in this fashion in the sorption particle bodies of chromatographic columns. Thus, the molecules are trapped by the configuration of the capillary, that is, by mechanical trapping, by the extra sorptive forces due to the gas molecule having a sorptive wall curved around it (like Figure VIII), and by other related conditions. Sample-gas components which are so trapped are at least for the most part not permanently held, but desorption is substantially delayed. It is believed that this is the phenomenon which produces tailing.

Accordingly, a gaseous body may be applied to the sorptive material prior to application of sample gas thereto, on the basis that trapping sites of the sorption particles are filled or deactivated by deposition from the gaseous body to a degree and in a manner sufficient to prevent undue trapping of the sample gas.

Thus the method of this invention comprises the control of tailing on a predetermined basis by loading sorptive material through deposition thereon from a gaseous body.

A start is made with a given body of sorption material. It is desired to separate out components from a particular sample-gas mixture. The body of sorptive material is then "tailored" to the needs of this sample gas to reduce tailing to a desired practical point. This "tailoring" is accomplished by loading this particular body of sorption material to modify the sorptive effect thereof. This loading is in effect designing a special set of sorption particles on a custom-made basis to handle a particular sample to a particular condition of reduced tailing, tending to equalize sorptive effects with respect to any one sample component. Thus, starting with the same form of given body of sorption material, any number of columns, each special to the separation problem of any one sample-gas mixture, can be provided according to this invention. In this connection, in order to simply and accurately produce such special columns, two factors are of substantial importance. One is that loading can be accomplished by deposition on the sorption particles from a gaseous body. Thus, as an example, a column may be preloaded from a carrier gas. The other factor is that the loading gaseous body is related, in sorptiveness with respect to the body of sorption particles, to the sample gas, on a dynamic competitive basis so that in a separation body such as a column, the deposit wins and holds the active site situations which heretofore have trapped sample-gas components to produce undesirable tailing.

Accordingly, the loading deposit is selected in such kind or percentage composition as to present a loading gaseous body to a virgin column which will deposit sufficiently and in a manner to substantially reduce tailing to a predetermined condition without unduly impairing sample-gas separation.

The factor of sorptiveness with respect to sample-gas mixtures herein, is taken with respect to the mixture component of interest, and where there is more than one such component, one of these may be used or an average or mean taken, in considering the factor of sample-gas mixture sorptiveness. In dynamic sorption competition in the column, the loading deposit must win over the sample-gas components of interest sufficiently to reduce tailing to a predetermined condition without adversely affecting component separation.

Sorption as referred to herein may involve condensation of gases which are compressible to a liquid state, or to a pseudo-gaseous or pseudo-liquid state. Accordingly in this invention, one form of loading gaseous body selection involves the boiling point-critical point temperature ranges of the sample and loading gases as related to the operating temperature of the system. In the separation situation wherein the component of interest in the sample mixture has a boiling point-critical point temperature range which includes the operating temperature of the column, a loading gas may be used which has a boiling point-critical point temperature range which similarly includes the operating temperature. Thus, as an example, a "condensible" sample may be run on a "condensible" carrier.

In furtherance of this example of one area of this invention, since the sample and pretreating gases are each related to the operating temperature, they are also related to each other, on a temperature basis. Thus, in this area within the scope of this invention, the loading gas must, at the operating temperature, sufficiently deactivate the strong sorption sites of the column particles to accomplish the desired amount of tailing reduction. It must also leave enough of the sorptiveness of the column to adequately separate the components of interest in the particular sample gas. That is, a given sample-gas mixture requires a certain amount of sorptiveness to achieve proper separation. The selected loading gas must mask out the "tailing" sites without reducing the available sorptiveness below the minimum required for the sample gas. In some loading gas-sample gas combinations, the selection tolerances can be large, and in others, it may be fairly critical.

The selection of loading gases is based on sorbability. This is a function of a combination of several factors, such as molecular weight, polar attractions, and others. The sorbability is recognized from experience with such factors and/or from actual experiment.

It has appeared that at least in one area of this invention, the boiling point-critical temperature ranges of the sample gas and the loading gas have importance in the selection of sample and loading gas combinations. For example, with alumina as column material, a butane containing sample, and dichlorodifluoromethane as a loading gas, a successful combination according to this invention was produced. In an effort to find another such combination, methyl chloride was substituted for the dichlorodifluoromethane and produced a successful new combination. The methyl chloride was selected by reference to conventionally available technical information as having a boiling point-critical temperature range similar to that of dichlorodifluoromethane.

As one practical approach to achieving the desired relation between loading gas, sample gas and sorption material, the following steps may be taken: (1) a sample-gas mixture is given; (2) an operating temperature is selected at which the sample component of interest cannot macroscopically condense; (3) a sorptive material is selected to match the polarity of the sample-gas component of interest; (4) a loading gaseous body is selected which cannot macroscopically condense at the operating temperature under the usual chromatographic column dynamic conditions. The loading gaseous body is further selected on the basis of sorptiveness in relation to the sorptiveness of the sample-gas component of interest, both with reference to the sorption material.

In one procedure the loading gaseous body may be a "pure" gas similarly sorbable with respect to the sample gas (i.e., its component of interest). In this case loading is continual and may be accomplished by making the loading gas and the carrier gas one and the same, thus providing a continual loading of a sorption column, interrupted only by interjection of measured units of sample gas.

In another procedure, the loading gas may be a mixture wherein a component or component unit thereof is deposited from the loading gas as the sorptive material loading deposit. In this latter procedure the deposit component is given a concentration in the loading gas which concentration is determined by the amount of masking out or sorptiveness which is desired in the sorptive material. Such a component with sorptiveness similar to that of the sample-gas component of interest would have a higher concentration and with sorptiveness strongly dominant would have a lower concentration.

In the case of the strongly dominant concentration, either continual or intermittent loading may be accomplished. The stronger the dominance, the longer lasting is the effect of loading and the greater the time possible between loadings. The strongly dominant deposit will maintain the loaded condition of the sorptive material for a period sufficient to permit suitable chromatographic separation of a number of measured units of sample-gas.

Further, sorptive material may thus be loaded with a strongly dominant deposit and thereafter a carrier gas different from the loading gas may for a time be used to elute measured units of the sample gas through the sorptive material.

This invention, therefore, provides a new and improved method of gas-solid elution chromatography.

This invention is intended to encompass loading of column material in a column as well as prior to being placed in a column. It is, further, intended to encompass loading directly from a carrier gas or from a gaseous body which is not the carrier gas.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. The method of gas analysis to produce a wave form sufficiently individual for measurement by integration and in representation of a hydrocarbon in the $C_2$–$C_5$ range as a component of interest in a sample-gas mixture and by gas-solid elution chromatography, said method comprising fabricating a composite chromatographic column material by passing a dichlorodifluoromethane ($CCl_2F_2$)

gas as a carrier gas through a chromatographic column filled with silica gel particles, whereby molecular deposition from said dichlorodifluoromethane gas on said silica gel provides said composite material and said composite material is mutually sorptive with respect to said hydrocarbon in the $C_2$–$C_5$ range to a degree and in a manner as to produce said integratable wave form when said sample gas mixture is travelled through said column by said carrier gas, passing a sample-gas mixture including a hydrocarbon in the $C_2$–$C_5$ range through said composite column material as a means of separating out said hydrocarbon from said mixture, detecting said separated hydrocarbon as it emerges from said column, and measuring said hydrocarbon to determine the relative amount thereof in said sample-gas mixture.

2. The method of gas analysis by gas-solid elution chromatography wherein sample-gas tailing is controlled on a predetermined basis, comprising loading the particles of a sorptive particle column with a relatively strongly sorptive gaseous fluid, passing a relatively weakly sorptive sample gas through said column as a means of separating out a component of interest from said sample gas, detecting said component as it emerges from said column, and measuring said component to determine the relative amount thereof in said sample gas.

3. The method of gas analysis by gas-solid elution chromatography wherein sample-gas tailing is controlled on a predetermined basis, comprising loading particles, exemplified as to sorptive nature by silica gel, of a sorptive particle column with a gaseous fluid, exemplified as to sorptive nature by dichlorodifluoromethane ($CCl_2F_2$) gas, passing a sample gas, exemplified as to sorptive nature by a hydrocarbon in the $C_2$–$C_5$ range, through said column as a means of separating out a component of interest from said sample gas, detecting said component as it emerges from said column, and measuring said component to determine the relative amount thereof in said sample gas.

4. The method of gas analysis by gas-solid elution chromatography wherein sample-gas tailing is controlled on a predetermined basis, comprising loading the silica gel of a silica gel column with a dichlorofluoromethane ($CCl_2F_2$) gas, passing a sample-gas mixture including a hydrocarbon in the $C_2$–$C_5$ range through said loaded silica gel column as a means of separating out said hydrocarbon from said mixture, detecting said separated component as it emerges from said column, and measuring said component to determine the relative amount of said component in said sample-gas mixture.

5. The method of gas analysis by gas-solid elution chromatography wherein sample gas tailing is controlled on a predetermined basis, comprising loading the alumina of an alumina column with water vapor from a combination of water vapor and nitrogen, passing a liquified petroleum gas (L.P.G.) through said loaded alumina column as a sample gas and as a means of separating out components of interest from said sample gas, detecting said components of interest as they emerge from said column, and measuring said components of interest to determine the relative amounts of said components in said sample gas.

6. The method of gas analysis by gas-solid elution chromatography wherein sample gas tailing is controlled on a predetermined basis, comprising loading the activated charcoal of an activated charcoal column with steam as a carrier gas, passing a sample gas mixture including an aromatic gas through said loaded activated charcoal column as a means of separating out said aromatic gas from said sample gas mixture, detecting said aromatic gas as it emerges from said column, and measuring said aromatic gas to determine the relative amount thereof in said sample gas mixture.

References Cited in the file of this patent

UNITED STATES PATENTS

| 1,616,242 | Voress et al. | Feb. 1, 1927 |
| 2,398,817 | Turner | Apr. 23, 1946 |
| 2,699,837 | Van Note | Jan. 18, 1955 |
| 2,813,010 | Hutchins | Nov. 12, 1957 |
| 2,845,136 | Robinson | July 29, 1958 |

OTHER REFERENCES

Breck et al.: JACS, vol. 78, No. 23, Dec. 8, 1956, pages 5963–5971.

C&EN April 9, 1956, pages 1692–1696.